United States Patent [19]

Ragen

[11] Patent Number: 5,078,098
[45] Date of Patent: Jan. 7, 1992

[54] BIRD FEEDER ASSEMBLY

[76] Inventor: Peter D. Ragen, 2951 S. Root River Pkwy., West Allis, Wis. 53095

[21] Appl. No.: 600,623

[22] Filed: Oct. 22, 1990

[51] Int. Cl.⁵ .............................................. A01K 39/01
[52] U.S. Cl. ................................................. 119/52.2
[58] Field of Search .................... 119/52.1, 52.2, 57.8, 119/51.01, 23, 15

[56] References Cited

U.S. PATENT DOCUMENTS

| | | | |
|---|---|---|---|
| 2,746,423 | 5/1956 | Runion | 119/52.1 |
| 3,094,973 | 6/1963 | Devall | 119/57.8 |
| 3,163,152 | 12/1964 | Stone | 119/23 |
| 3,295,498 | 1/1967 | Brown | 119/52.2 X |
| 3,301,217 | 1/1967 | Prowinsky | 119/51 |
| 3,643,631 | 2/1972 | Wade et al. | 119/23 |
| 3,742,914 | 7/1973 | Spencer et al. | 119/52.2 |
| 4,204,500 | 5/1980 | Podjan | 119/57.8 |
| 4,281,624 | 8/1981 | Raines | 119/52.1 |
| 4,632,061 | 12/1986 | Tucker et al. | 119/57.8 |

FOREIGN PATENT DOCUMENTS 2419625 11/1975 Fed. Rep. of Germany ........ 119/23

Primary Examiner—Gene Mancene
Assistant Examiner—R. Thomas Price
Attorney, Agent, or Firm—Joseph S. Heino

[57] ABSTRACT

A bird feeder assembly has a feed bin and a feed bin cover and utilizes a plurality of extension members and a plurality of complementary shoulder members to slidably and securely engage the feed bin within the feed bin cover.

6 Claims, 1 Drawing Sheet

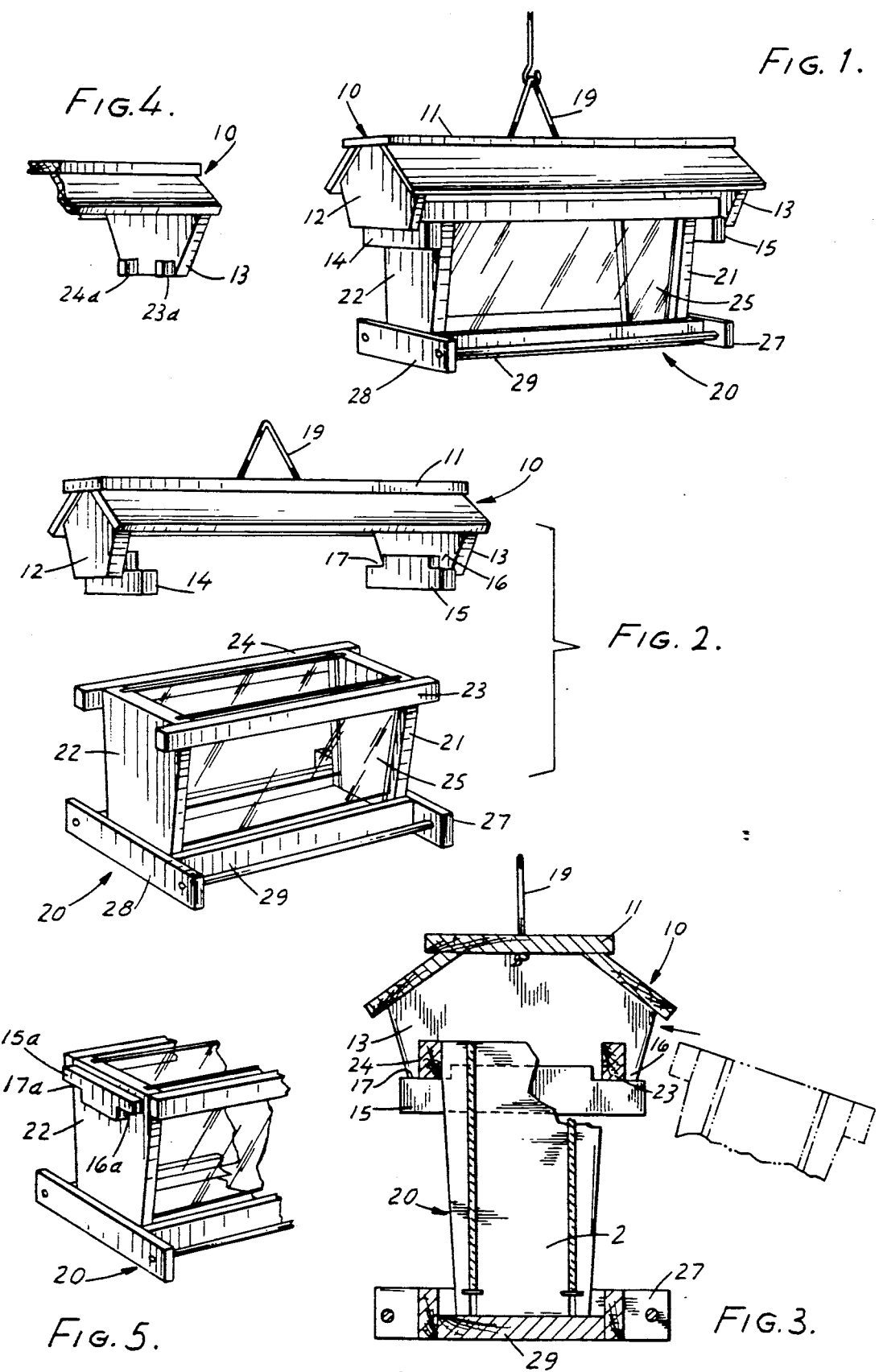

BIRD FEEDER ASSEMBLY

FIELD OF THE INVENTION

This invention relates generally to bird feeder assemblies and more particularly to feeder assemblies of the gravity fed type having one or more removable feed bins or trays.

BACKGROUND OF THE INVENTION

The use of gravity fed bird feeder assemblies is well known. Such feeder assemblies typically utilize an interior feed compartment. The feed compartment, or feed bin, is defined by glass, plastic or wood panels, at least one of which is usually tapered inwardly so as to facilitate the gravity feed concept. Such panels also define a slot at or near the bottom of at least one of the panels where feed is discharged and made available to the feeding birds intended to benefit by the device. Such feeders also typically utilize a top aperture and access door for accessing the feed compartment for the purpose of periodically replenishing the food supply. Such a configuration has been recognized to have the disadvantage of making it difficult to refill the feed compartment, particularly where the feeder is suspended from above.

To overcome this problem, bird feeder assemblies having removable feed bins or feed trays have been utilized and are also well known. See, for example, U.S. Pat. No. 4,632,061 issued to Tucker et al. which utilizes a roof covered main column or post around which a plurality of feed bins are situated. Another type of gravity fed bird feeder which utilizes a feed assembly having a feeding tray slidably mounted to a pole so as to be elevated into position under a protective roof is illustrated by U.S. Pat. No. 4,102,308 issued to Prowinsky. Such feeder assemblies typically include a number of relatively complex parts or elements in order to accomplish the desired object of securing the bins or trays to the members which support them under the roof.

SUMMARY OF THE INVENTION

It is, therefore, a principal object of this invention to provide a new, useful and uncomplicated bird feeder assembly having a feed bin cover or roof and a slidably insertable and removable feed bin which requires only a minimal number of elements and which requires only a minimal number of steps to insert and securely engage or to disengage and remove the feed bin to or from the feed bin cover, respectively. It is another object of this invention to provide such a bird feeder assembly which reduces the risk of spillage of bird feed when the feed bin is in the process of being removed from or being inserted into the feed bin cover when the feed supply is to be replenished. It is yet another object of this invention to provide such a bird feeder assembly which provides for interlocking engagement between the feed bin and the feed bin cover or roof when properly in place so as to protect the feed bin and the feed therein from inclement weather and from unwanted animals. It is still another object of this invention to provide such a bird feeder assembly which accomplishes all of this while providing an aesthetically pleasing bird feeder assembly from all points outside the feeder.

The present invention has obtained these objects. It provides for a bird feeder assembly having a feed bin adapted to be easily and slidably removed or inserted into and securely retained by a feeder bin cover or roof. The feed bin is comprised of a bin compartment which is defined by four walls, two of which are side support walls and two of which are inwardly sloping glass or plastic panels, and a floor. Each side support wall and each glass or plastic panel is arranged opposite the other such that the side support walls define the sides of the feed bin compartment and the glass or plastic panels define the front and back of the feed bin compartment, thereby providing a generally rectangular feed bin configuration.

In one embodiment of the present invention, the front and back of the bin compartment is further provided with a longitudinally extending support member running parallel with the upper edge of each glass or plastic panel. The support member, however, extends at each end beyond each of the side walls so as to form an outwardly and longitudinally extending post member at each corner of the rectangular feed bin configuration. The feed bin cover is, in turn, provided with complimentary shoulder support members having notches in them which serve to receive and engage the ends of the post members extending from each corner of either end of the feed bin when the bin is slidably inserted into the feed bin cover. The shoulder support members serve to support the feeder bin when the bin is in full engagement with the bin cover and allow the bin to be slidably removed therefrom and inserted therein.

In another embodiment of the present invention, shoulder support members having notches are provided at both ends of the feed bin compartment and the feed bin compartment is provided with complimentary extension members which likewise serve to support the feeder bin when the bin is engaged with the bin cover. The foregoing and other features of the bird feeder assembly of the present invention will be further apparent from the description which follows.

BRIEF DESCRIPTION OF THE DRAWINGS

FIG. 1 is a perspective view of the bird feeder assembly of the present invention.

FIG. 2 is another perspective view of the assembly shown in FIG. 1 and showing the feed bin disengaged.

FIG. 3 is a cross-sectioned side elevational view of the assembly shown in FIGS. 1 and 2 with a fragmentary sectional view showing the feed bin engagement means.

FIGS. 4 and 5 are fragmentary perspective views of the feed bin cover and feed bin showing an alternative embodiment of the feed bin engagement means.

DETAILED DESCRIPTION

Referring now to the drawings in detail, FIGS. 1 and 2 show a bird feeder assembly constructed in accordance with the present invention. The bird feeder assembly comprises a feed bin generally identified 20 having side walls 21, 22 and side wall base members 27, 28, respectively, between which extends a floor 29. In the preferred embodiment, glass panels 25 are included to retain the feed within the feed bin 20 and to provide the user with an indication of when the feed bin supply should be replenished. The feed bin 20 further includes longitudinally extending feed bin support members or posts 23, 24 which extend at each end beyond the bin side walls 21, 22.

The bird feeder assembly further comprises a feed bin cover generally identified 10 suspended by a strap 19 and having a roof portion 11, side portions 12, 13 and side portion shoulder members 14, 15, respectively. Each shoulder member 14, 15 is provided with notches 16, 17. The shoulder notches are complementary to and designed to engage and retain those portions of the feed bin posts 23, 24 which extend beyond the feed bin side walls 21, 22.

In application, removal of the feed bin 20 from the feed bin cover 10 in order to accomplish refilling and replenishment of the feed supply within the feed bin 20 is accomplished by slightly lifting the feed bin 20 so as to disengage the feed bin posts 23, 24 from the feed bin cover shoulder member notches 16, 17. See FIG. 3. The feed bin 20 is then slid out from under the feed bin cover 10. Insertion of the feed bin 20 is accomplished by the reverse of this process. As is shown by phantom view in FIG. 3, the feed bin 20 is positioned at somewhat of an angle in relation to its normal position in order to access the gap defined by the bin cover roof portion 11 and the bin cover side portion shoulder member 15. Though not shown, the same is true for the opposite end of the feed bin cover 10. As the feed bin 20 comes completely under the feed bin cover 10, the feed bin 20 is then lowered slightly to engage the ends of the feed bin posts 23, 24 with the feed bin cover shoulder notches 16, 17, respectively. While not shown, the same engagement is also achieved at the other end of the feed bin cover 10 with the other side portion shoulder member 14.

Referring to FIGS. 4 and 5, an alternative embodiment of the feed bin engagement means is shown. In this embodiment, the feed bin cover side portion 13 is provided with extending feed bin support members 23a, 24a and the feed bin side wall 22 is provided with a shoulder member 15a. The shoulder member 15a is provided with notches 16a, 17a. These shoulder notches 16a, 17a are complimentary to and likewise designed to engage and retain those portions of the support numbers 23a, 24a. While not shown, the same engagement is also achieved at the other end of the feed bin cover 10 and feed bin 20.

From the foregoing detailed description of the illustrated embodiments of the invention set forth herein, it will be apparent there has been provided a new, useful and uncomplicated bird feeder assembly having a feed bin cover or roof and a slidably removable and insertable, but securely engageable, feed bin which requires only a minimal number of elements and a minimal number of steps to use, which reduces the risk of spillage of bird feed when the feed bin is in the process of being replenished, which protects the feed bin and its contents from inclement weather and from unwanted animals, and which accomplishes all of this while providing an aesthetically pleasing bird feeder assembly from all points outside the feeder.

The principles of this invention having been fully explained in connection with the foregoing, I hereby claim as my invention:

1. A bird feeder assembly which comprises
a feed bin, said feed bin comprising a feed bin compartment having a portion for receiving bird feed and a portion for dispensing bird feed,
a feed bin cover, said feed bin cover comprising a roof portion over said feed bin compartment,
means for slideably removing said feed bin from said feed bin cover and for slideably inserting said feed bin into said feed bin cover, and
means for interlockingly engaging said feed bin within said feed bin cover when said feed bin is inserted into said feed bin cover, said interlocking engagement means comprising a plurality of longitudinal feed bin members having distal ends extending from said feed bin and a plurality of notches within said roof portion, said notches being complimentary to and functionally adapted to receive the distal ends of said extending feed bin members whereby said feed bin is slideably inserted under and dropped down into said feed bin cover and removably secured therewithin when the distal ends of said feed bin members are received by said roof portion notches.

2. A bird feeder assembly which comprises
a feed bin, said feed bin comprising a feed bin compartment having a portion for receiving bird feed and a portion for dispensing bird feed,
a feed bin cover, said feed bin cover comprising a roof portion over said feed bin compartment,
means for slideably removing said feed bin from said feed bin cover and for slideably inserting said feed bin into said feed bin cover, and
means for interlockingly engaging said feed bin within said feed bin cover when said feed bin is inserted into said feed bin cover, said interlocking engagement means comprising a plurality of members having distal ends extending from said roof portion and a plurality of notches within said feed bin, said notches being complimentary to and functionally adapted to receive the distal ends of said extending roof portion members whereby said feed bin is slideably inserted under and dropped down into said feed bin cover and removably secured therewithin when the distal ends of said roof portion members are received by said feed bin notches.

3. A bird feeder assembly which comprises
a feed bin, said feed bin comprising a feed bin compartment having a portion for receiving bird feed and a portion for dispensing bird feed,
a feed bin cover, said feed bin cover comprising a roof portion over said feed bin compartment and having downwardly extending support members,
means for receiving said feed bin within said feed bin cover, said receiving means comprising a slide shoulder connected to each of said downwardly extending bin cover support members, said slide shoulders each having a top slide surface, and
means for interlockingly engaging said feed bin within said feed bin cover, said engagement means comprising a plurality of feed bin members extending from said feed bin and a plurality of notches situated along the top slide surface of each of said feed bin cover slide shoulders, said feed bin extension members being complimentary to and functionally adapted to slide along the top slide surface of said feed bin cover slide shoulders and be dropped down into and engaged by said feed bin cover slide shoulder notches whereby said feed bin is removably secured within said feed bin cover.

4. The bird feeder assembly of claim 3, including a feed bin cover access means which comprises a space defined between said roof and said feed bin cover shoulder members whereby said extending feed bin members are functionally adapted to be inserted therebetween.

5. A bird feeder assembly which comprises
a feed bin, said feed bin comprising a feed bin compartment having a portion for receiving bird feed and a portion for dispensing bird feed, a feed bin cover, said feed bin cover comprising a roof portion over said feed bin compartment and having downwardly extending support members, means for receiving said feed bin within said feed bin cover, said receiving means comprising a plurality of extension members extending from each of said downwardly extending bin cover support members, and means for interlockingly engaging said feed bin within said feed bin cover, said engagement means comprising a plurality of slide shoulders connected to said feed bin, each of said slide shoulders having a bottom slide surface, and a plurality of notches situated along the bottom slide surface of each of said slide shoulders, said feed bin cover extension members being complimentary to and functionally adapted such that the bottom slide surfaces of said feed bin slide shoulders slide over said extension members until said feed bin slide shoulder notches drop down onto and engage said extension members whereby said feed bin is removably secured within said feed bin cover.

6. The bird feeder assembly of claim 5 including a feed bin cover access means which comprises a space defined between said roof and said feed bin cover extension members whereby said feed bin shoulder members are functionally adapted to be inserted therebetween.

* * * * *